(12) United States Patent
Sivak et al.

(10) Patent No.: US 11,960,941 B2
(45) Date of Patent: *Apr. 16, 2024

(54) MANAGING VIRTUAL MACHINE MEMORY BALLOON USING TIME SERIES PREDICTIVE DATA

(71) Applicant: Red Hat, Inc., Raleigh, NC (US)

(72) Inventors: Martin Sivak, Brno (CZ); Andrej Krejcir, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/738,920

(22) Filed: May 6, 2022

(65) Prior Publication Data

US 2022/0269547 A1 Aug. 25, 2022

Related U.S. Application Data

(63) Continuation of application No. 16/450,558, filed on Jun. 24, 2019, now Pat. No. 11,327,810.

(51) Int. Cl.
*G06F 9/455* (2018.01)
*G06F 9/50* (2006.01)

(52) U.S. Cl.
CPC ........ *G06F 9/5077* (2013.01); *G06F 9/45558* (2013.01); *G06F 2009/4557* (2013.01); *G06F 2209/5011* (2013.01); *G06F 2209/5019* (2013.01); *G06F 2209/508* (2013.01)

(58) Field of Classification Search
CPC ........... G06F 9/5077; G06F 2209/5019; G06F 2209/508; G06F 9/45558; G06F 2009/4557; G06F 2209/5011

See application file for complete search history.

(56) References Cited

U.S. PATENT DOCUMENTS

| 8,799,892 | B2 | 8/2014 | Hepkin |
| 9,459,900 | B2 | 10/2016 | Tsirkin |
| 9,507,540 | B1 | 11/2016 | Adogla et al. |

(Continued)

OTHER PUBLICATIONS

Jenitha et al. "Dynamic Memory Allocation Using Ballooning and Virtualization in Cloud Computing", IOSR Journal of Computer Engineering, vol. 16, Issue 2, Ver. IV, Mar.-Apr. 2014, pp. 19-23, located at http://iosrjournals.org/iosr-jce/papers/Vol16-issue2/Version-4/C016241923.pdf.

*Primary Examiner* — Emerson C Puente
*Assistant Examiner* — Jonathan R Labud
(74) *Attorney, Agent, or Firm* — Womble Bond Dickinson (US) LLP

(57) ABSTRACT

A virtual machine's (VM's) usage of a resource over a first time period may be monitored to determine a load pattern for the VM. A time series analysis of the load pattern may be performed to generate a predictive resource usage model, the predictive resource usage model indicating one or more predicted variations in the usage of the resource by the VM over a second time period. A predicted resource usage of the VM at a future time that is within the second time period may be determined based, at least in part, on the predictive resource usage model. An amount of the resource to allocate to the VM at a current time may be determined based, at least in part, on the predicted resource usage of the VM at the future time and the actual resource usage of the VM at the current time.

19 Claims, 6 Drawing Sheets

(56) References Cited

U.S. PATENT DOCUMENTS

| | | | |
|---|---|---|---|
| 9,547,600 B2 | 1/2017 | Tarasuk-Levin et al. | |
| 9,910,774 B1 | 3/2018 | Gupta et al. | |
| 10,484,301 B1 | 11/2019 | Shukla et al. | |
| 2008/0109390 A1* | 5/2008 | Iszlai | G06F 11/3447 706/14 |
| 2012/0246638 A1 | 9/2012 | He et al. | |
| 2013/0185433 A1 | 7/2013 | Zhu et al. | |
| 2015/0309825 A1* | 10/2015 | Farkas | G06F 9/5011 718/1 |
| 2017/0097842 A1 | 4/2017 | Bugenhagen | |
| 2017/0147227 A1 | 5/2017 | Stabrawa et al. | |
| 2019/0034095 A1 | 1/2019 | Singh et al. | |

* cited by examiner

MANAGING VIRTUAL MACHINE MEMORY BALLOON USING TIME SERIES PREDICTIVE DATA

CROSS-REFERENCE TO RELATED APPLICATIONS

This application is a continuation of U.S. patent application Ser. No. 16/450,558 filed Jun. 24, 2019, the contents of which are hereby incorporated by reference in its entirety.

TECHNICAL FIELD

Aspects of the present disclosure relate to virtual machines (VMs), and more particularly, to managing resources allocated to VMs.

BACKGROUND

Hypervisors abstract the physical resources of a computing device such as physical processing devices (e.g., processors, CPUs, etc.) and physical memory (e.g., RAM) into virtual resources which can be utilized to deploy multiple VMs. The hypervisor may manage and assign these virtual resources to each VM running on the computing device. Resource ballooning is a technique that allows a VM to return resources that are currently not in use to the hypervisor, which may rebalance the resources among existing VMs. The hypervisor may also (or, alternatively) use resources returned via ballooning to create additional VMs, which may result in the resources of the computing device being overcommitted.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Resource ballooning allows a hypervisor to artificially enlarge its pool of resources by taking advantage of, or reclaiming unused resources that were previously allocated to other VMs. By redistributing (e.g., to new or other existing VMs) resources that are assigned to an existing VM but are not currently in use by that VM, the resource pool of the hypervisor can be overcommitted. However, if one or more VMs suddenly begin demanding their resources back after the hypervisor has used ballooning to rebalance the resource pool among all the VMs, this may cause problems for the hypervisor. For example, if the hypervisor is already overcommitted owing to resource ballooning, then the hypervisor may not be able to provide the necessary resources that each VM is suddenly demanding. In addition, the hypervisor may only be able to return resources to a VM at a slow rate since the hypervisor must first locate available resources, which is difficult when the resources of the hypervisor are already overcommitted. Unable to receive the resources they need, applications running on those VMs may crash or experience reduced performance.

The present disclosure addresses the above-noted and other deficiencies by using a processing device to monitor a VM's usage of a resource over a first time period to determine a load pattern for the VM. The load pattern may correspond to the variations in usage of the resource over the first time period. The processing device may perform a time series analysis of the load pattern to generate a predictive resource usage model, the predictive resource usage model indicating one or more predicted variations in the usage of the resource by the VM over a second time period. The processing device may then determine, based at least in part on the predictive resource usage model, a predicted resource usage of the VM at a future time that is within the second time period. The processing device may then determine an amount of the resource to allocate to the VM at a current time based, at least in part, on the predicted resource usage of the VM at the future time and the actual resource usage of the VM at the current time. The processing device may perform this process simultaneously for one or more different types of resource usage for each VM running on a computing device. As used herein, the terms "resources" and "virtual resources" refer to virtual resources provided by a hypervisor for the provisioning of VMs, as discussed in further detail herein.

Figure 1:
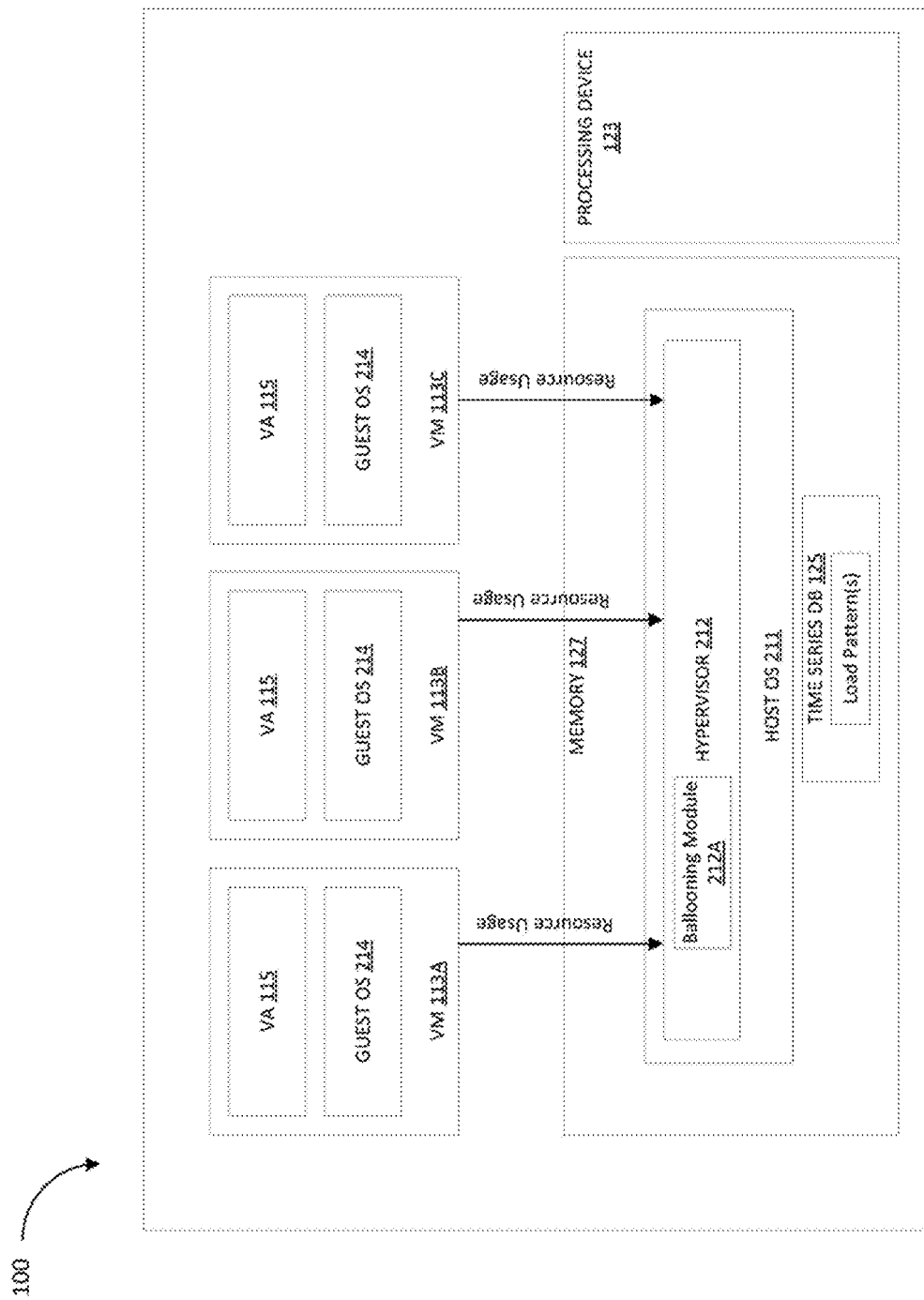
FIG. 1 is a block diagram that illustrates an example computing device, in accordance with some embodiments of the present disclosure.

FIG. 1 is a block diagram that illustrates an example computing device 100. Computing device 100 may include hardware such as processing device 123 (e.g., processors, central processing units (CPUs)), memory 127 (e.g., random access memory (RAM), storage devices (e.g., hard-disk drive (HDD), solid-state drive (SSD), etc.), and other hardware devices (e.g., sound card, video card, etc.). In some embodiments, memory 127 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 100. The computing device 100 may comprise any suitable type of computing device or machine that has a programmable processor including, for example, server computers, desktop computers, laptop computers, tablet computers, smartphones, set-top boxes, etc. In some examples, the computing device 100 may comprise a single machine or may include multiple interconnected machines (e.g., multiple servers configured in a cluster). Memory 127 may include host operating system (OS) 211, which may manage the execution of other components (e.g., software, applications, etc.) and/or may manage access to the hardware (e.g., processors, memory, storage devices etc.) of the computing device 100.

The host OS 211 may include a hypervisor 212, which may also be known as a virtual machine monitor (VMM). In the example shown, hypervisor 212 may be a component of the host operating system 211. In another example, hypervisor 212 may run on top of host operating system 211, or may run directly on host hardware without the use of a host operating system 211. Hypervisor 212 may manage system resources, including access to processing device 123, memory 127, other storage devices (e.g., HDDs, SSDs), and/or other devices (e.g., sound cards, video cards, etc.). The hypervisor 212, though typically implemented in software, may emulate and export a bare machine interface to higher level software in the form of virtual processors and guest memory (virtual resources). Higher level software may comprise a standard or real-time operating system (OS), may be a highly stripped down operating environment with limited operating system functionality, and/or may not include traditional OS facilities, etc. For example, higher level software may be a network virtualization platform (not shown) such as RedHat™ OpenStack™. Hypervisor 212 may present other software (i.e., "guest" software) the abstraction of one or more virtual machines (VMs) that provide the same or different abstractions to various guest software (e.g., guest operating system, guest applications).

In some embodiments, a network virtualization platform (not shown), such as RedHat™ OpenStack™, may also execute on the host OS 211. The network virtualization platform may use a consistent set of application programming interfaces (APIs) to abstract those virtual resources provided by the hypervisor 212 one step further into discrete pools that may be used to configure and deploy VMs (e.g., VMs 113) and virtual applications (e.g., VA 115) that administrators and users may interact with directly. The network virtualization platform may include a deployment controller to handle creation of VMs as well as provisioning of such VMs with virtual applications. The deployment controller may also function to manage the operations of the virtual applications. For example, the network virtualization platform may utilize the deployment controller to create virtual switches (and a VM for the switch to run on) as well as manage the operations of the virtual switch, e.g., configuring/modifying rules and groups, managing connections with other virtual network functions (VNFs) and handling diagnostic tasks). The VMs 113 may be isolated, in that they are not connected to any other device or component of computing device 100, whether virtual or otherwise.

VMs 113a-113c may execute on computing device 100 as described herein. In one embodiment, a VM may be a software implementation of a machine (e.g., a software implementation of a computing device) that includes its own operating system (referred to as guest OS 214) and executes application programs, applications, and software such as VNFs. The hypervisor 212 may emulate the hardware (or other physical resources) to provide virtual resources which may be used by the VMs to execute software/applications, as discussed in more detail herein. The VM may be, for example, a hardware emulation, a full virtualization, a para-virtualization, and an operating system-level virtualization VM.

The VM may execute guest software that uses an underlying emulation of the physical resources (e.g., virtual processors and guest memory—virtual resources). As illustrated in FIG. 1, a VM 113 may execute a VA 115 (e.g., a component/part of a larger network), such as a virtual switch, within a runtime environment (not shown in the figures). Both the VM 113 and the VA 115 may be configured and deployed by a network virtualization platform executing atop the host OS 211, as discussed above. The network virtualization platform, via the computing device 100 may provide administrators and users with the capability to virtualize a variety of network functions.

As further illustrated in FIG. 1, each VM 113 includes a VA 115. For example, a VA 115 may execute in a VM 113. Although one VA 115 is illustrated in a respective virtual environment 113, a virtual environment 113 may include multiple VAs 115 in other embodiments. In some embodiments, VAs 115 may be deployed and managed by a deployment controller (not illustrated in the figures) executing as part of a network virtualization platform.

Continuing to refer to FIG. 1, computing device 100 (via processing device 123) may execute resource ballooning module 212A to perform the operations described herein. Although illustrated in FIG. 1 as a component of hypervisor 212, in some embodiments resource ballooning module 212A may run directly on host OS 211 or may run directly on computing device 100 without the use of host OS 211. In some embodiments, execution of the ballooning module 212A may cause computing device 100 to perform the operations described herein via hypervisor 212. Computing device 100 may monitor a resource usage of one or more resources for each VM 113 over a first time period. The first time period may be any time period that is long enough to obtain sufficient resource usage data from each of the VMs 113. For example, computing device 100 may monitor the resource usage of the VMs 113 for a period of a year, 6 months, 2 weeks, or any other appropriate time period. Computing device 100 may monitor one or more of the memory usage, processor usage, input/output operation usage (e.g., number of writes and reads from storage media), storage bandwidth usage (amount of data written/read), network bandwidth usage, and usage of any other appropriate resource for each VM 113 and store this resource usage information in a time series database 125. The pattern of (e.g., variations in) resource usage for a particular resource over the first time period may be referred to as a load pattern. For example, computing device 100 may obtain a memory usage load pattern for each VM 113, as well as processor and network bandwidth usage load patterns for each VM 113 as a result of monitoring the resource usages of each of the VMs 113. Thus, the time series database 125 may be said to store the load patterns for each VM 113. Computing device 100 may then perform a time series analysis on each load pattern for each VM 113 to obtain a set of predictive resource usage models for each VM 113. For example, computing device 100 may perform a time series analysis on the memory usage, processor usage and bandwidth usage load patterns for VM 113a to obtain corresponding memory usage, processor usage and bandwidth usage predictive resource usage models for VM 113a. Each predictive resource usage model may indicate and model predicted variations in the usage of a particular resource by a VM 113 over a second time period. Computing device 100 may utilize any appropriate time series analysis model to obtain a predictive resource usage model, such as the autoregressive integrated moving average (ARIMA) model. A predictive resource usage model for a VM 113 obtained in this way may be used to predict that VM 113's usage of a particular resource for a second time period that is in the future. In some embodiments, the second time period may be equal in length to the first time period. For example, a predictive resource usage model determined based on a load pattern of VM 113a's memory usage of from January 2016 to December 2016 may be used to predict the memory usage of the VM 113a from January 2017 to December 2017. In some embodiments, the predictive resource model may be modified based, at least in part, on observations of the actual resource usage, as discussed in further detail herein. Computing device 100 may generate for each VM 113, predictive resource usage models for each type of resource usage monitored.

Figure 2:
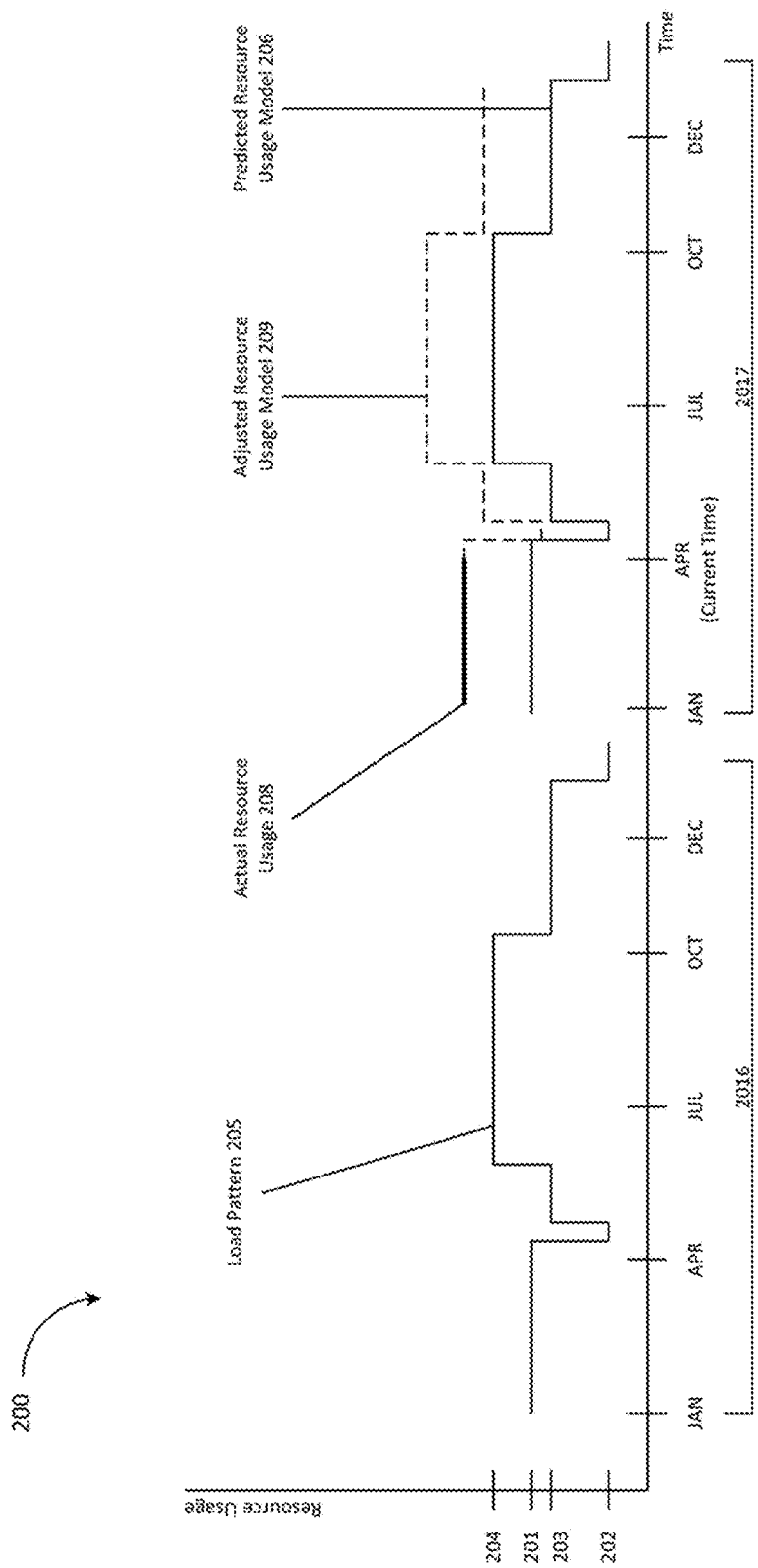
FIG. 2 is a graph illustrating an example load pattern and predicted resource usage model, in accordance with some embodiments of the present disclosure.

FIG. 2 illustrates a graph 200 of the observed variations in memory usage of the VM 113a over a first time period of a year (2016) (i.e. a memory load pattern 205 for the year 2016) and a predictive resource usage model 206 indicating the predicted variations in memory usage of VM 113a over a second year (2017) (i.e. a second time period). VM 113a may be a VM running on computing device 100 in an office environment, in one example. Graph 200 illustrates the years 2006 and 2007 as being divided up on a monthly basis, from January to December. As can be seen, the observed memory usage of VM 113a during 2016 (i.e. the load pattern 205) may remain relatively constant at a first level 201 (e.g., a first variation in usage) until April, when, for example, an Easter break may cause a period (e.g., 2 weeks) of lower usage at a second level 202 (e.g., a second variation in usage). For example, this may be as a result of a user of the computing device 100 going on vacation, thus resulting in little resource demand from the VM 113a. Thereafter, the memory usage may continue at various higher levels (203 and 204—third and fourth variations in usage respectively) until mid-December, when, for example, a Christmas break may cause another prolonged period of lower usage at the second level 202 (second variation in usage) (e.g., 2 weeks). As illustrated in FIG. 2, there may be variations in the memory usage between the Easter and Christmas breaks as well. Computing device 100 may utilize a time series analysis model to analyze the load pattern 205 and generate the predictive resource usage model 206 that may predict the variations in memory usage of the VM 113a during 2017. As can be seen in FIG. 2, the predictive resource usage model 206 may indicate and model each predicted variation in memory usage of the VM 113 during the year 2017. Although discussed with respect to memory usage of VM 113a for ease of illustration and description, the discussion with respect to FIG. 2 may be simultaneously applied to one or more other types of resource usage for each VM 113 running on computing device 100 as discussed herein.

In some embodiments, the first and second time periods may be different. For example, a user may generate a predicted resource usage model for the year 2017 using a load pattern based on resource usage monitored from January 2016 to May 2016. As can be seen, the observed memory usage of VM 113a during 2016 (i.e. the load pattern) may remain relatively constant at a first level 201 (first variation in usage) until April, when, for example, an Easter break may cause a period (e.g., 2 weeks) of lower usage at a second level 202 (second variation in usage). For example, this may be as a result of a user of the computing device 100 going on vacation, thus resulting in little resource demand from the VM 113a. Thereafter, the memory usage may continue at a higher level 203 until May 2016 when the hypervisor 212A may cease monitoring the resource usage. The hypervisor 212A may utilize a time-series analysis model to generate a predictive resource usage model indicating and modeling predicted variations in the memory usage of VM 113a from May 2016 onward. However, this predictive resource model may not initially include predicted variations for May to December 2016 or May to December 2017. In this embodiment, the user may then utilize one or more of the monitored variations and apply them to the time period from May 2016 onwards. For example, because the Easter and Christmas breaks may be similar in duration and memory usage, a user may utilize the model for resource usage at level 202 during Easter break in April 2016, and apply it to December 2016 to account for the Christmas break, as well as April and December 2017. A user may reapply monitored variations to future time periods throughout the second time period in this fashion whenever they determine that a model for a variation in resource usage can be reapplied to a future time. For example, a user may determine that the model for the variation in usage over Easter break in April 2016 (level 202) can be used not only for Christmas break, but also for Memorial day, Thanksgiving and other holidays. Thus, the user can apply the model for level 202 usage to Memorial day, those days designated as Thanksgiving holidays and days that other holidays fall on. In some embodiments, there may be parts of the second time period that the user may not have applicable models for based on the monitored usage from January to April 2016. In such scenarios, the computing device 100 may utilize a model corresponding to the average resource usage over the monitored time period (i.e. the first time period) for those time periods where there are no applicable models.

Continuing to refer to FIG. 2, in some embodiments, computing device 100 may utilize observations about the actual resource usage during a third time period to adjust the predictive resource usage model 206. For example, computing device 100 may observe that the actual memory usage 208 (indicated with a thicker line) of VM 113a from January 2017 to the current time (the third time period) has been above the predicted resource usage indicated by the predicted resource usage model 206 for that time span. Thus, computing device 100 may adjust the predicted resource usage model 206 based on the observed difference between the actual usage 208 and the usage indicated by the predicted resource usage model 206 from January 2017 to the current time (the third time period) and generate an adjusted predicted resource usage model 209. For example, computing device 100 may observe that the actual memory usage of VM 113a from January 2017 to the current time has been 120% of the resource usage indicated by the predicted resource usage model 206 for that time span and apply a corrective factor to the predicted resource usage model 206 based on the 20% difference. The adjusted predicted resource usage model 209 illustrates this difference. It should be noted that FIG. 2 is for ease of illustration and may not be exactly to scale.

Although FIG. 2 illustrates the predicted resource usage model for the entire 2017 year being adjusted, in some embodiments, the predicted resource usage model 206 may be adjusted over certain time spans depending on the length of the observed difference between the actual usage and the usage indicated by the predicted resource usage model 206. In some embodiments, the predicted resource usage model 206 may be adjusted over a time span corresponding to the length of the observed difference (in the example of FIG. 2, this would be 3 months—corresponding to the time span from the beginning of January to the beginning of April—the third time period). If the observed difference is over a period of e.g., 1-2 months, then the predictive resource usage model 206 may be adjusted for 1-2 months following the current time. If the observed difference is over a period of e.g., 4-6 months, then the predictive resource usage model 206 may be adjusted for 4-6 months following the current time. In some embodiments, computing device 100 may continuously monitor (e.g., periodically or at regular intervals) observed differences between the actual resource usage and the predicted resource usage indicated by the predicted resource usage model 206 for particular time periods, and continuously adjust the predicted resource usage model 206 based on such observed differences. It should be noted that after a first adjustment is made, computing device 100 may observe differences between the actual resource usage and the predicted resource usage indicated by the adjusted predicted resource usage model 209. As discussed above, computing device 100 may perform this continuous monitoring and adjustment for each predicted resource usage model (e.g., memory usage, processor usage, I/O operation usage, storage bandwidth usage and network bandwidth usage) for each VM 113.

Referring back to FIG. 1, upon obtaining a predicted memory usage model for VM 113a, and making any adjustments based on observations of a difference between the actual usage and the usage indicated by the predicted memory usage model, computing device 100 may determine an amount of memory to allocate to the VM 113a at the current time based at least in part on the predicted memory usage of the VM 113a at the future time. More specifically, computing device 100 may utilize the predicted memory usage model to examine the predicted memory usage of VM 113a at a future time that is ahead of the current time. For example, computing device 100 may examine the predicted memory usage 2 hours ahead of the current time, 1 day ahead of the current time or any other appropriate time period ahead of the current time. Based on the predicted memory usage at the future time and the actual resource usage at the current time, computing device 100 may determine the amount of memory that should currently be allocated to the VM 113a to satisfy the predicted resource usage at the future time. Thus, computing device 100 may increase or decrease the memory currently allocated to the VM 113a based on the determined amount so as to ensure that the memory allocated to VM 113a when the current time reaches the future time is sufficient to meet the predicted resource usage at the future time. Computing device 100 may determine the amount of memory that should currently be allocated to the VM 113a (and adjust accordingly) as described herein periodically or at regular intervals (e.g., every 2 hours, once a day). Computing device 100 may perform this process of determining an amount of a resource that should currently be allocated to the VM 113 based on a predicted resource usage at a future time and an actual resource usage at a current time for each monitored resource usage (e.g., memory usage, processor usage, I/O operation usage, storage bandwidth usage and network bandwidth usage) for each VM 113.

Figure 3:
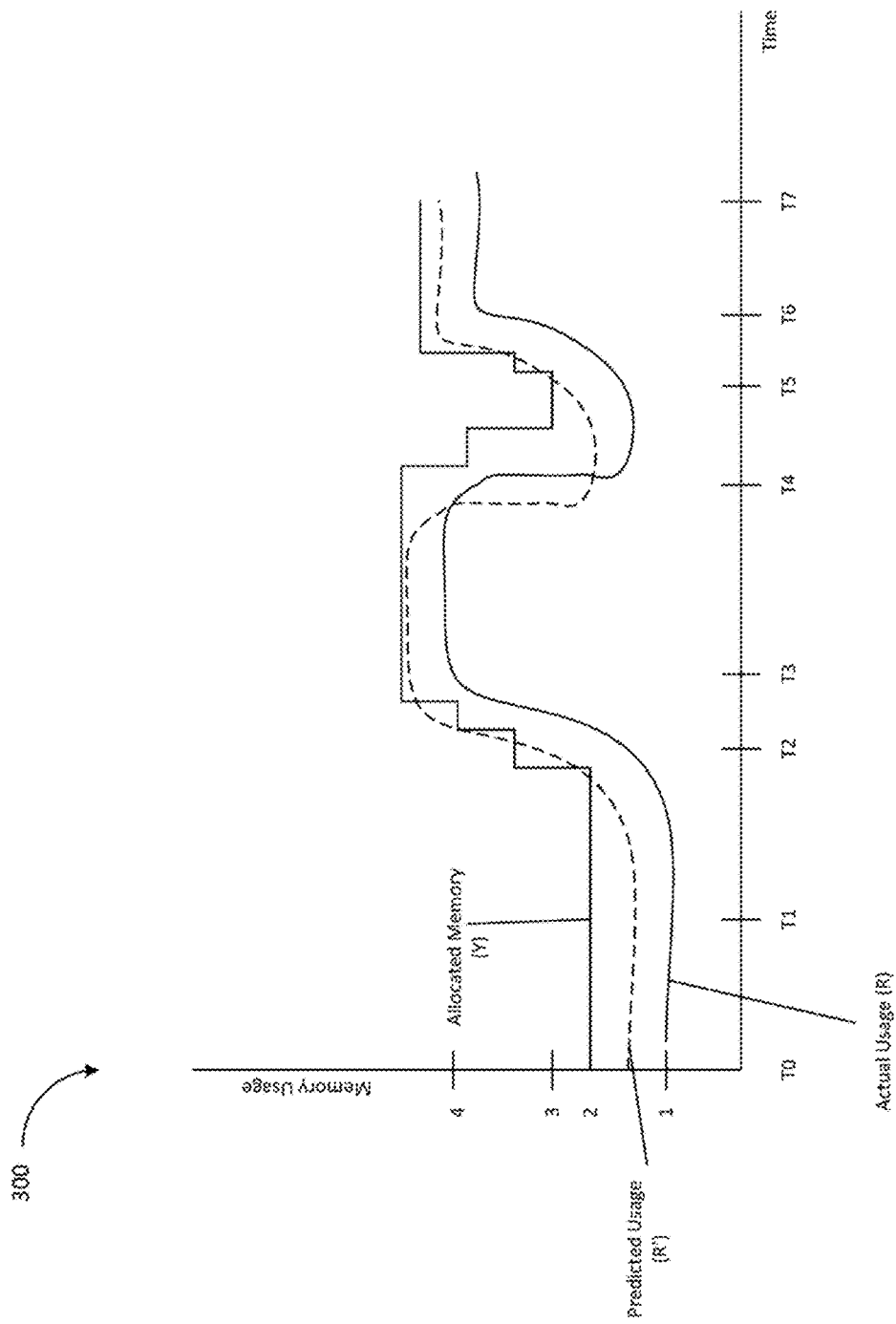
FIG. 3 is a graph illustrating the amount of memory currently allocated to a VM, the predicted memory usage of the VM and the actual memory usage of the VM over time, in accordance with some embodiments of the present disclosure.

FIG. 3 illustrates a graph 300 of the actual memory usage of VM 113a (R), the predicted memory usage of VM 113a (R'), and the amount of memory allocated to VM 113a (Y), over a time period from T0-T7. It should be noted that the scale for memory usage (1-4) is for simplicity of illustration and ease of description only, and any appropriate unit (depending on the resource in question) may be used. The amount of memory allocated to VM 113a at the current time ($Y_t$) may be given by equation 1:

$$Y_t = MAX(R, R'_{t+1}) \times \text{resource reserve}$$

In the above equation, t may be the current time, t+1 may be a future time, and the resource reserve may correspond to a predefined difference between the amount of memory currently allocated to VM 113a ($Y_t$) and the actual amount of memory being used at the current time ($R_t$). When determining an amount of another resource to allocate (based on e.g., predictive resource usage models for other resources), the resource reserve may correspond to a predefined difference between the amount of that resource currently allocated to VM 113a ($Y_t$) and the actual amount of that resource being used at the current time by VM 113a (R). Stated differently, the resource reserve comprises a minimum amount by which the amount of the resource allocated to the VM 113a at the current time ($Y_t$) must exceed the actual resource usage of the VM 113a at the current time (R). Computing device 100 may continuously maintain the resource reserve, thus if the actual amount of memory being used at the current time ($R_t$) increases, then computing device 100 may increase the amount of memory currently allocated to VM 113a ($Y_t$) by a corresponding amount so as to maintain the predefined difference between the amount of reserved memory currently allocated to VM 113a ($Y_t$) and the actual amount of memory being used at the current time ($R_t$) (i.e. the resource reserve). However, the resource reserve on its own may not be capable of providing sufficient memory to deal with large and sudden spikes in memory usage by VM 113a. Thus, as indicated by equation 1, the amount of reserved memory allocated to VM 113a at any given time may be defined as the larger of the current memory usage of VM 113a (R) and the predicted memory usage of VM 113a at a future time ($R'_{t+1}$), multiplied by the resource reserve.

For example, at time T1, computing device 100 may utilize the predicted resource usage model and examine the predicted memory usage at time T2 ($R'_{T2}$), which may be a future time that is 1 day (or any other appropriate period) ahead of T1. Computing device 100 may observe that the predicted resource usage at time T2 is 3. Computing device 100 may also observe that the actual amount of memory being used at the current time ($R_{T1}$) is 1, which is smaller than 3. Because ($R'_{T2}$) is larger than ($R_{T1}$), Computing device may determine the amount of memory currently allocated to VM 113 ($Y_{T1}$) as:

$$(R'_{T2}) \times \text{resource reserve}$$

Similarly, at time T3, computing device may utilize the predicted resource usage model and examine the predicted memory usage at time T4 ($R'_{T4}$), which may be a future time that is 1 day (or any other appropriate period) ahead of T3. Computing device 100 may observe that the predicted resource usage at time T4 is at 2. Computing device 100 may also observe that the actual amount of memory being used at the current time ($R_{T3}$) is at 4, which is larger than 2. Because ($R_{T3}$) is larger than ($R'_{T4}$), Computing device may determine the amount of reserved memory currently allocated to VE 113 ($Y_{T3}$) as:

$$(R_{T3}) \times \text{resource reserve}$$

In this way, computing device 100 may ensure that the amount of memory allocated to VM 113a (Y) will be sufficient to meet the memory demands of the VM 113a regardless of sudden spikes in memory usage requirements or other similar events.

Figure 4:
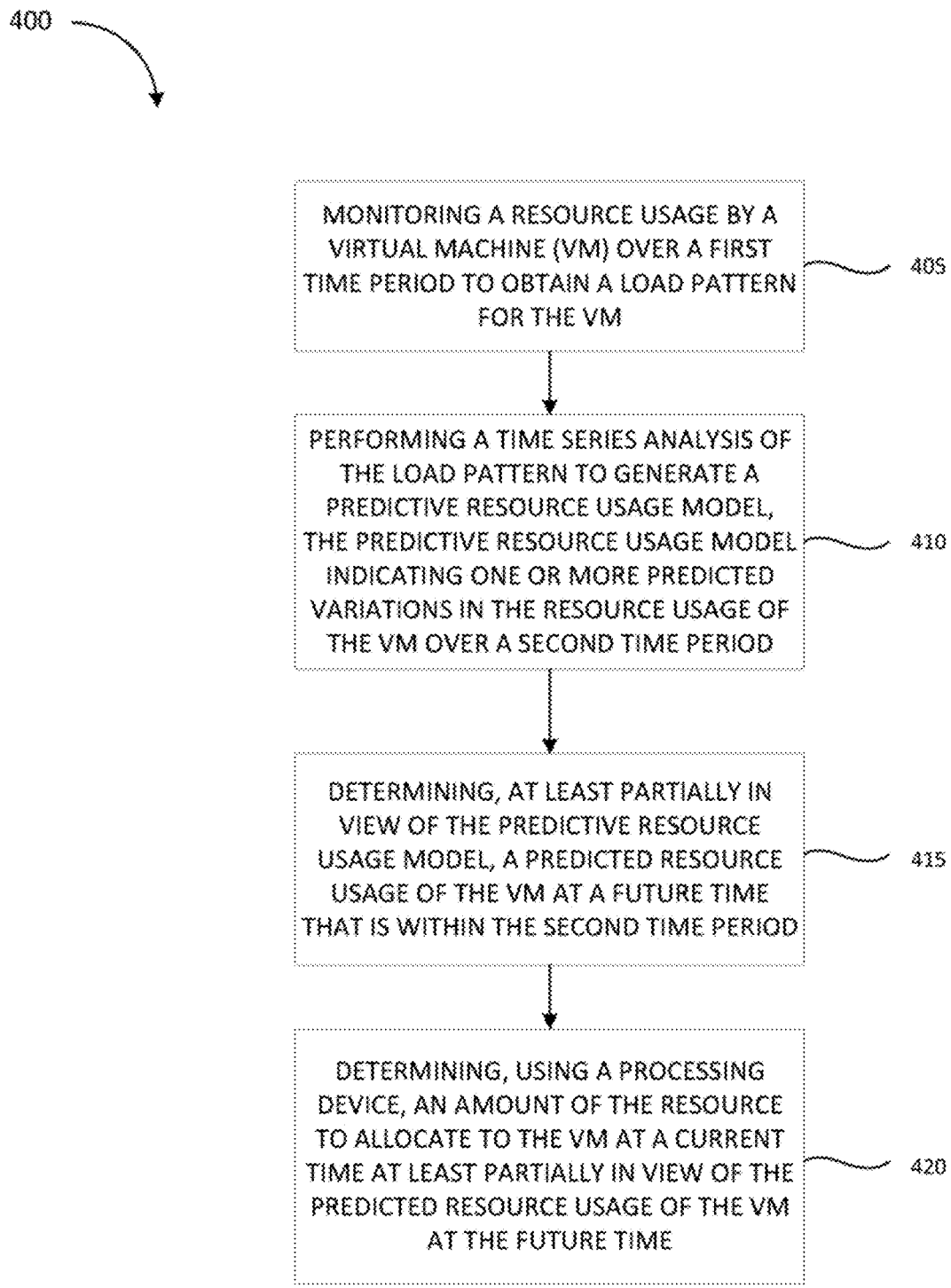
FIG. 4 is a flow diagram of a method for determining the amount of resources to be allocated to a VM at a current time, in accordance with some embodiments of the present disclosure.

FIG. 4 is a flow diagram of a method 400 of determining an amount of a resource to allocate to a VM at a current time, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 100 illustrated in FIG. 1).

The method 400 begins at block 405, where computing device 100 may monitor a resource usage by a virtual machine (VM) 113 over a first time period to obtain a load pattern for the VM 113. More specifically, computing device 100 may monitor a resource usage of one or more resources for each VM 113 over a first time period. The first time period may be any time period that is long enough to obtain sufficient resource usage data from each of the VMs 113. For example, computing device 100 may monitor the resource usage of the VMs 113 for a period of a year, 6 months, 2 weeks, or any other appropriate time period. Computing device 100 may monitor one or more of the memory usage, processor usage, bandwidth usage, and usage of any other appropriate resource for each VM 113 and store this resource usage information in a time series database 125. The pattern of (e.g., variations in) resource usage by a VM 113 for a particular resource over the first time period may be referred to as a load pattern. For example, computing device 100 may obtain a memory usage load pattern for each VM 113, as well as processor and bandwidth usage load patterns for each VM 113 as a result of monitoring the resource usage of each of the VMs 113.

At block 410, computing device 100 may perform a time series analysis on each load pattern for each VM 113 to obtain a set of predictive resource usage models for each VM 113. Each predictive resource usage model may indicate one or more predicted variations in the resource usage of a VM 113 over a second time period. For example, computing device 100 may perform a time series analysis on the memory usage, processor usage and bandwidth usage load patterns for VM 113a to obtain corresponding memory usage, processor usage and bandwidth usage predictive resource usage models for VM 113a. Each predictive resource usage model may indicate and model predicted variations in the usage of a particular resource by a VM 113 over the second time period. Computing device 100 may utilize any appropriate time series analysis model to obtain a predictive resource usage model, such as the autoregressive integrated moving average (ARIMA) model. A predictive resource usage model for a VM 113 obtained in this way may be used to predict that VM 113's usage of a particular resource for a second time period that is in the future. In some embodiments, the second time period may be equal in length to the first time period. For example, a predictive resource usage model determined based on a load pattern of VM 113a's memory usage of from January 2016 to December 2016 may be used to predict the memory usage of the VM 113a from January 2017 to December 2017. In some embodiments, the predictive resource model may be modified based in part on observations of the actual resource usage, as discussed in further detail herein. Computing device 100 may generate for each VM 113, predictive resource usage models for each type of resource usage monitored.

FIG. 2 illustrates a graph 200 of the observed variations in memory usage of the VM 113a over a first time period of a year (2016) (i.e. a memory load pattern 205 for the year 2016) and a predictive resource usage model 206 indicating the predicted variations in memory usage of VM 113a over a second year (2017) (i.e. a second time period). VM 113a may be a VM running on computing device 100 in an office environment, in one example. Graph 200 illustrates the years 2006 and 2007 as being divided up on a monthly basis, from January to December. As can be seen, the observed memory usage of VM 113a during 2016 (i.e. the load pattern 205) may remain relatively constant at a first level 201 (e.g., a first variation in usage) until April, when, for example, an Easter break may cause a period (e.g., 2 weeks) of lower usage at a second level 202 (e.g., a second variation in usage). For example, this may be as a result of a user of the computing device 100 going on vacation, thus resulting in little resource demand from the VM 113a. Thereafter, the memory usage may continue at various higher levels (203 and 204—third and fourth variations in usage respectively) until mid-December, when, for example, a Christmas break may cause another prolonged period of lower usage at the second level 202 (second variation in usage) (e.g., 2 weeks). As illustrated in FIG. 2, there may be variations in the memory usage between the Easter and Christmas breaks as well. Computing device 100 may utilize a time series analysis model to analyze the load pattern 205 and generate the predictive resource usage model 206 that may predict the variations in memory usage of the VM 113a during 2017. As can be seen in FIG. 2, the predictive resource usage model 206 may indicate and model each predicted variation in memory usage of the VM 113a during the year 2017. Although discussed with respect to memory usage of VM 113a for ease of illustration and description, the discussion with respect to FIG. 2 may be simultaneously applied to one or more other types of resource usage for each VM 113 running on computing device 100 as discussed herein.

Referring back to FIG. 4, at block 415, computing device 100 may determine, based at least in part on the predictive resource usage model, a predicted resource usage of the VM 113a at a future time that is within the second time period. More specifically, computing device 100 may utilize the predicted memory usage model to examine the predicted memory usage of VM 113a at a future time that is ahead of the current time (e.g., a future time within the second time period). For example, computing device 100 may examine the predicted memory usage 2 hours ahead of the current time, 1 day ahead of the current time or any other appropriate time period ahead of the current time.

Figure 5:
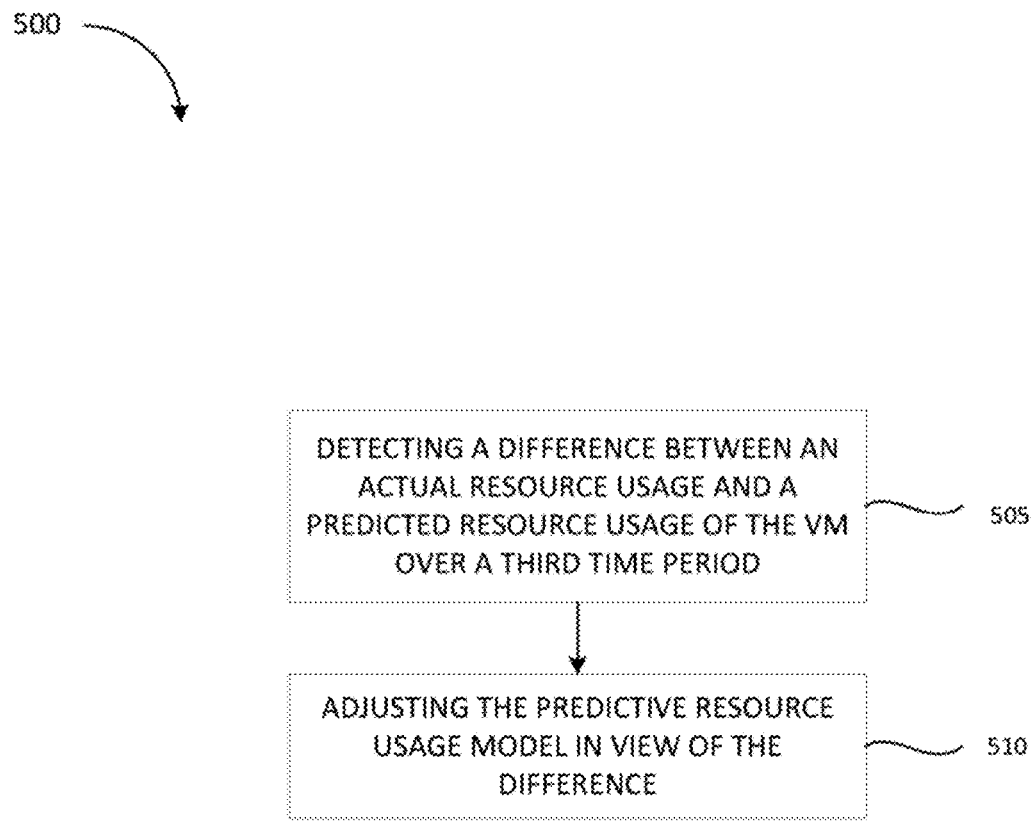
FIG. 5 is a flow diagram of a method for adjusting a predictive resource usage model, in accordance with some embodiments of the present disclosure.

FIG. 5 illustrates a method 500 for adjusting predictive resource usage models, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 100 illustrated in FIG. 1).

At block 505, computing device may detect a difference between an actual resource usage and a predicted resource usage of the VM 113a over a third time period. More specifically, in some embodiments, computing device 100 may utilize observations about the actual resource usage during the third time period to adjust the predictive resource usage model 206. For example, (with reference to FIG. 2) computing device 100 may observe that the actual memory usage 208 of VM 113a from January 2017 to the current time (the third time period) has been above the predicted resource usage indicated by the predicted resource usage model 206 for that time span. Thus, at block 510, computing device 100 may adjust the predicted resource usage model 206 based on the observed difference between the actual usage 208 and the usage indicated by the predicted resource usage model 206 from January 2017 to the current time (April 2017) (the third time period) and generate an adjusted predicted resource usage model 209. For example, computing device 100 may observe that the actual memory usage of VM 113a from January 2017 to the current time has been 120% of the resource usage indicated by the predicted resource usage model 206 for that time span and apply a corrective factor to the predicted resource usage model 206 based on the 20% difference. The adjusted predicted resource usage model 209 illustrates this difference. It should be noted that FIG. 2 is for ease of illustration and may not be to scale.

Although FIG. 2 illustrates the predicted resource usage model for the entire 2017 year being adjusted, in some embodiments, the predicted resource usage model 206 may be adjusted over certain time spans depending on the length of the observed difference between the actual usage and the usage indicated by the predicted resource usage model 206. In some embodiments, the predicted resource usage model 206 may be adjusted over a time span corresponding to the length of the observed difference (in the example of FIG. 2, this would be 3 months—corresponding to the time span from the beginning of January to the beginning of April). If the observed difference is over a period of e.g., 1-2 months, then the predictive resource usage model 206 may be adjusted for 1-2 months following the current time. If the observed difference is over a period of e.g., 4-6 months, then the predictive resource usage model 206 may be adjusted for 4-6 months following the current time. In some embodiments, computing device 100 may continuously monitor (e.g., periodically or at regular intervals) observed differences between the actual resource usage and the predicted resource usage indicated by the predicted resource usage model 206 for particular time periods, and continuously adjust the predicted resource usage model 206 based on such observed differences. It should be noted that after a first adjustment is made, computing device 100 may observe differences between the actual resource usage and the predicted resource usage indicated by the adjusted predicted resource usage model 209. As discussed above, computing device 100 may perform this continuous monitoring and adjustment for each predicted resource usage model (e.g., memory usage, processor usage, I/O operation usage, storage bandwidth usage and network bandwidth usage) for each VM 113.

Although FIG. 2 illustrates the predicted resource usage model for the entire 2017 year being adjusted, in some embodiments, the predicted resource usage model 206 may be adjusted over certain time spans depending on the length of the observed difference between the actual usage and the usage indicated by the predicted resource usage model 206. In some embodiments, the predicted resource usage model 206 may be adjusted over a time span corresponding to the length of the observed difference (in the example of FIG. 2, this would be 3 months—corresponding to the time span from the beginning of January to the beginning of April—the third time period). If the observed difference is over a period of e.g., 1-2 months, then the predictive resource usage model 206 may be adjusted for 1-2 months following the current time. If the observed difference is over a period of e.g., 4-6 months, then the predictive resource usage model 206 may be adjusted for 4-6 months following the current time. In some embodiments, computing device 100 may continuously monitor (e.g., periodically or at regular intervals) observed differences between the actual resource usage and the predicted resource usage indicated by the predicted resource usage model 206 for particular time periods, and continuously adjust the predicted resource usage model 206 based on such observed differences. It should be noted that after a first adjustment is made, computing device 100 may observe differences between the actual resource usage and the predicted resource usage indicated by the adjusted predicted resource usage model 209. As discussed above, computing device 100 may perform this continuous monitoring and adjustment for each predicted resource usage model (e.g., memory usage, processor usage, I/O operation usage, storage bandwidth usage and network bandwidth usage) for each VM 113.

Referring back to FIG. 4, at block 420, computing device 100 may determine an amount of the resource to allocate to the VM 113a at a current time based at least in part on the predicted resource usage of the VM 113a at the future time. More specifically, based on the predicted memory usage at the future time and the actual resource usage at the current time, computing device 100 may determine the amount of memory that should currently be allocated to the VM 113a to satisfy the predicted resource usage at the future time. Thus, computing device 100 may increase or decrease the memory currently allocated to the VM 113a based on the determined amount so as to ensure that the memory allocated to VM 113a when the current time reaches the future time is sufficient to meet the predicted resource usage at the future time. Computing device 100 may determine the amount of memory that should currently be allocated to the VM 113a (and adjust accordingly) as described herein periodically or at regular intervals (e.g., every 2 hours, once a day). Computing device 100 may perform this process of determining an amount of a resource that should currently be allocated to the VM 113 based on a predicted resource usage at a future time and an actual resource usage at a current time for each monitored resource usage (e.g., memory usage, processor usage and bandwidth usage) for each VM 113.

FIG. 3 illustrates a graph 300 of the actual memory usage of VM 113a (R), the predicted memory usage of VM 113a (R'), and the amount of memory allocated to VM 113a (Y), over a time period from T0-T7. It should be noted that the scale for memory usage (1-4) is for simplicity of illustration and ease of description only, and any appropriate unit (depending on the resource in question) may be used. The amount of memory allocated to VM 113a at the current time ($Y_t$) may be given by equation 1:

$$Y_t = MAX(R, R'_{t+1}) \times \text{resource reserve}$$

In the above equation, t may be the current time, t+1 may be a future time, and the resource reserve may correspond to a predefined difference between the amount of memory currently allocated to VM 113a ($Y_t$) and the actual amount of memory being used at the current time ($R_t$). When determining an amount of another resource to allocate (based on e.g., predictive resource usage models for other resources), the resource reserve may correspond to a predefined difference between the amount of that resource currently allocated to VM 113a ($Y_t$) and the actual amount of that resource being used at the current time by VM 113a (R). Stated differently, the resource reserve comprises a minimum amount by which the amount of the resource allocated to the VM 113a at the current time ($Y_t$) must exceed the actual resource usage of the VM 113a at the current time (R). Computing device 100 may continuously maintain the resource reserve, thus if the actual amount of memory being used at the current time ($R_t$) increases, then computing device 100 may increase the amount of memory currently allocated to VM 113a ($Y_t$) by a corresponding amount so as to maintain the predefined difference between the amount of reserved memory currently allocated to VM 113a ($Y_t$) and the actual amount of memory being used at the current time ($R_t$) (i.e. the resource reserve). However, the resource reserve on its own may not be capable of providing sufficient memory to deal with large and sudden spikes in memory usage by VM 113a. Thus, as indicated by equation 1, the amount of reserved memory allocated to VM 113a at any given time may be defined as the larger of the current memory usage of VM 113a (R) and the predicted memory usage of VM 113a at a future time ($R'_{t+1}$), multiplied by the resource reserve.

For example, at time T1, computing device 100 may utilize the predicted resource usage model and examine the predicted memory usage at time T2 ($R'_{T2}$), which may be a future time that is 1 day (or any other appropriate period) ahead of T1. Computing device 100 may observe that the predicted resource usage at time T2 is 3. Computing device 100 may also observe that the actual amount of memory being used at the current time ($R_{T1}$) is 1, which is smaller than 3. Because ($R'_{T2}$) is larger than ($R_{T1}$), Computing device may determine the amount of memory that should currently be allocated to VM 113a ($Y_{T1}$) as:

$$(R'_{T2}) \times \text{resource reserve}$$

Similarly, at time T3, computing device may utilize the predicted resource usage model and examine the predicted memory usage at time T4 ($R'_{T4}$), which may be a future time that is 1 day (or any other appropriate period) ahead of T3. Computing device 100 may observe that the predicted resource usage at time T4 is at 2. Computing device 100 may also observe that the actual amount of memory being used at the current time ($R_{T3}$) is at 4, which is larger than 2. Because ($R_{T3}$) is larger than ($R'_{T4}$), Computing device may determine the amount of memory that should currently be allocated to VM 113 ($Y_{T3}$) as:

$$(R_{T3}) \times \text{resource reserve}$$

In this way, computing device 100 may ensure that the amount of memory allocated to VM 113a (Y) will be sufficient to meet the memory demands of the VM 113a regardless of sudden spikes in memory usage requirements or other similar events.

Figure 6:
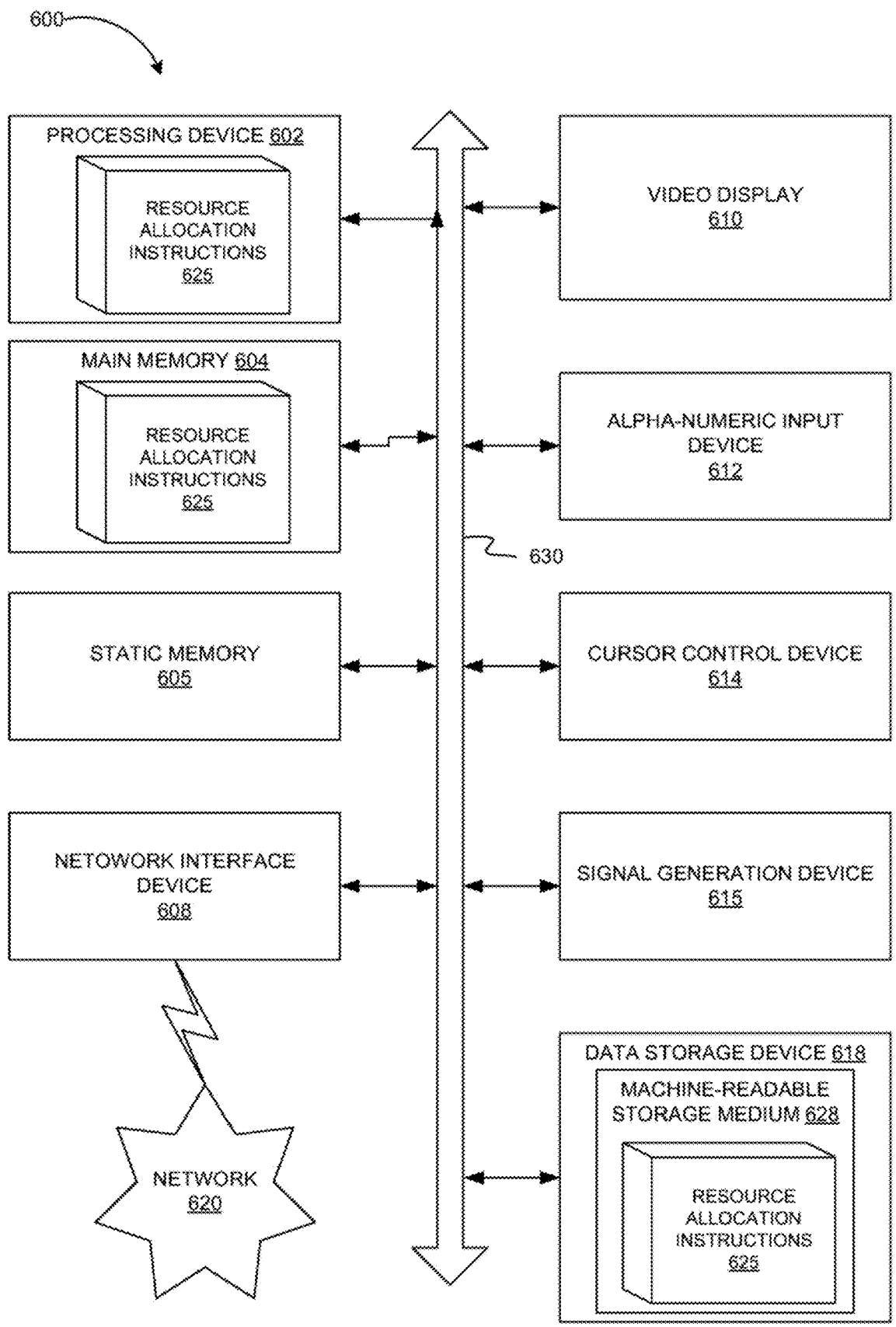
FIG. 6 is a block diagram of an example computing device that may perform one or more of the operations described herein, in accordance with some embodiments of the present disclosure.

FIG. 6 is a block diagram of an example computing device 600 that may perform one or more of the operations described herein, in accordance with some embodiments. For example, computing device 600 may monitor a VM's usage of a resource over a first time period to determine a load pattern for the VM. The load pattern may correspond to the variations in usage of the resource over the first time period. Computing device 600 may perform a time series analysis of the load pattern to generate a predictive resource usage model, the predictive resource usage model indicating one or more predicted variations in the usage of the resource by the VM over a second time period. Computing device 600 may then determine, based at least in part on the corresponding predictive resource usage model, a predicted resource usage of the VM at a future time that is within the second time period. Computing device 600 may then determine an amount of the resource to allocate to the VM at a current time based, at least in part, on the predicted resource usage of the VM at the future time and the actual resource usage of the VM at the current time. Computing device 600 may perform this process for one or more different types of resource usage for each VM running on a computing device.

Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of resource allocation instructions 625, e.g., instructions for carrying out the operations described herein, in accordance with one or more aspects of the present disclosure. Resource allocation instructions 625 may also reside, completely or at least partially, within main memory 604 and/or within processing device 602 during execution thereof by computing device 600, main memory 604 and processing device 602 also constituting computer-readable media. The instructions may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
monitoring, by the processing device, a resource usage by a virtual machine (VM) over a first time period to obtain a load pattern for the VM;
performing, by the processing device, a time series analysis of the load pattern to generate a predictive resource usage model, the predictive resource usage model indicating one or more predicted variations in the resource usage of the VM over a second time period;
determining, by the processing device, at least partially in view of the predictive resource usage model, a predicted resource usage of the VM at a future time that is within the second time period;
determining, by the processing device, an amount of the resource to allocate to the VM at a current time at least partially in view of the predicted resource usage of the VM at the future time and a resource reserve;

executing, by the processing device, the VM using the determined amount of allocated resources;

detecting, by the processing device, a difference between an actual resource usage and a predicted resource usage of the VM over a third time period;

adjusting, by the processing device, the predictive resource usage model in view of the difference between the actual resource usage and the predicted resource usage of the VM over the third time period to generate a corrected predictive resource usage model;

determining, by the processing device, a corrected amount of the resource to allocate to the VM in view of the corrected predictive resource usage model; and executing, by the processing device, the VM using the corrected amount of the resource.

2. The method of claim 1, wherein determining an amount of the resource to allocate to the VM comprises:

comparing the predicted resource usage of the VM at the future time to an actual resource usage of the VM at the current time; and multiplying the larger of the predicted resource usage of the VM at the future time and the actual resource usage of the VM at the current time with the resource reserve.

3. The method of claim 2, wherein the resource reserve comprises a minimum amount by which the amount of the resource allocated to the VM at the current time must exceed the actual resource usage of the VM at the current time.

4. The method of claim 1, wherein the resource usage of the VM includes one of: memory usage of the VM, processor usage of the VM, input/output operation usage of the VM, storage bandwidth usage of the VM and network bandwidth usage of the VM.

5. The method of claim 1, wherein the detecting a difference between an actual resource usage and a predicted resource usage of the VM and the adjusting the predictive resource usage model in view of the difference are performed periodically.

6. The method of claim 1, wherein the determining a predicted resource usage of the VM at a future time and the determining an amount of the resource to allocate to the VM at a current time are performed periodically to account for the one or more predicted variations in the resource usage of the VM over the second time period.

7. A system comprising:

a memory to store one or more load patterns; and a processing device to:

monitor a resource usage by a virtual machine (VM) over a first time period to obtain a load pattern for the VM;

perform a time series analysis of the load pattern to generate a predictive resource usage model, the predictive resource usage model indicating one or more predicted variations in the resource usage of the VM over a second time period;

determine, at least partially in view of the predictive resource usage model, a predicted resource usage of the VM at a future time that is within the second time period;

determine an amount of the resource to allocate to the VM at a current time at least partially in view of the predicted resource usage of the VM at the future time and a resource reserve;

execute the VM using the determined amount of allocated resources;

detect a difference between an actual resource usage and a predicted resource usage of the VM over a third time period;

adjust the predictive resource usage model in view of the difference between the actual resource usage and the predicted resource usage of the VM over the third time period to generate a corrected predictive resource usage model;

determine a corrected amount of the resource to allocate to the VM in view of the corrected predictive resource usage model; and execute the VM using the corrected amount of the resource.

8. The system of claim 7, wherein the processing device is further to:

detect a difference between an actual resource usage and a predicted resource usage of the VM over a third time period; and adjust the predictive resource usage model in view of the difference.

9. The system of claim 8, wherein the processing device detects a difference between an actual resource usage and a predicted resource usage of the VM and adjusts the predictive resource usage model in view of the difference periodically.

10. The system of claim 7, wherein to determine an amount of the resource to allocate to the VM, the processing device is to:

compare the predicted resource usage of the VM at the future time to an actual resource usage of the VM at the current time; and multiply the larger of the predicted resource usage of the VM at the future time and the actual resource usage of the VM at the current time with the resource reserve.

11. The system of claim 10, wherein the resource reserve comprises a minimum amount by which the amount of the resource allocated to the VM at the current time must exceed the actual resource usage of the VM at the current time.

12. The system of claim 7, wherein the resource usage of the VM includes one of: memory usage of the VM, processor usage of the VM, input/output operation usage of the VM, storage bandwidth usage of the VM and network bandwidth usage of the VM.

13. The system of claim 7, wherein the processing device determines a predicted resource usage of the VM at a future time and determines an amount of the resource to allocate to the VM at a current time periodically to account for the one or more predicted variations in the resource usage of the VM over the second time period.

14. A non-transitory computer-readable storage medium including instructions that, when executed by a processing device, cause the processing device to:

monitor a resource usage by a virtual machine (VM) over a first time period to obtain a load pattern for the VM;

perform a time series analysis of the load pattern to generate a predictive resource usage model, the predictive resource usage model indicating one or more predicted variations in the resource usage of the VM over a second time period;

determine, at least partially in view of the predictive resource usage model, a predicted resource usage of the VM at a future time that is within the second time period;

determine, by the processing device, an amount of the resource to allocate to the VM at a current time at least partially in view of the predicted resource usage of the VM at the future time and a resource reserve;

execute the VM using the determined amount of allocated resources;

detect a difference between an actual resource usage and a predicted resource usage of the VM over a third time period;

adjust the predictive resource usage model in view of the difference between the actual resource usage and the predicted resource usage of the VM over the third time period to generate a corrected predictive resource usage model;

determine a corrected amount of the resource to allocate to the VM in view of the corrected predictive resource usage model; and execute the VM using the corrected amount of the resource.

15. The non-transitory computer-readable storage medium of claim 14, wherein the processing device is further to:

detect a difference between an actual resource usage and a predicted resource usage of the VM over a third time period; and adjust the predictive resource usage model in view of the difference.

16. The non-transitory computer-readable storage medium of claim 15, wherein the processing device detects a difference between an actual resource usage and a predicted resource usage of the VM and adjusts the predictive resource usage model in view of the difference periodically.

17. The non-transitory computer-readable storage medium of claim 14, wherein to determine an amount of the resource to allocate to the VM, the processing device is to:

compare the predicted resource usage of the VM at the future time to an actual resource usage of the VM at the current time; and multiply the larger of the predicted resource usage of the VM at the future time and the actual resource usage of the VM at the current time with the resource reserve.

18. The non-transitory computer-readable storage medium of claim 17, wherein the resource reserve comprises a minimum amount by which the amount of the resource allocated to the VM at the current time must exceed the actual resource usage of the VM at the current time.

19. The non-transitory computer-readable storage medium of claim 14, wherein the resource usage of the VM includes one of: memory usage of the VM, processor usage of the VM, input/output operation usage of the VM, storage bandwidth usage of the VM and network bandwidth usage of the VM.

* * * * *